US006023771A

United States Patent [19]

Watanabe

[11] Patent Number: 6,023,771

[45] Date of Patent: Feb. 8, 2000

[54] CLOCK REDUNDANCY SYSTEM

[75] Inventor: Shinji Watanabe, Tokyo, Japan

[73] Assignee: NEC Corporation, Tokyo, Japan

[21] Appl. No.: 09/113,521

[22] Filed: Jul. 10, 1998

[30] Foreign Application Priority Data

Jul. 11, 1997 [JP] Japan .................................... 9-202433

[51] Int. Cl.[7] ........................................................ G06F 1/06

[52] U.S. Cl. ............................................. 713/501; 713/502

[58] Field of Search .................................... 713/501, 502; 327/291, 292, 295; 331/46, 49

[56] References Cited

U.S. PATENT DOCUMENTS 4,672,639 6/1987 Tanabe et al. .......................... 375/371
5,479,644 12/1995 Hongo ..................................... 713/501
5,574,757 11/1996 Ogawa .................................... 375/376

FOREIGN PATENT DOCUMENTS 60-70826 4/1985 Japan .
7-95025 4/1995 Japan .

*Primary Examiner*—Thomas M. Heckler
*Attorney, Agent, or Firm*—McGinn & Gibb, P.C.

[57] ABSTRACT

An information processing apparatus of the present invention is, in order to prevent a malfunction by an increase or a decrease of an oscillation frequency of a clock oscillator, provided with redundancy with 2n+1 (n is a positive integer) clock oscillators and includes a counter for counting a clock of each of the clock oscillators. Values of the counters are compared with each other at every certain timing to select a normal clock oscillator, and the clock of the oscillator is used by modules of the information processing apparatus. Accordingly, even if a little disorder in oscillation frequency occurs with any of the clock oscillators, the information processing apparatus continues to operate without stopping and without malfunctioning. Further, a difference between each two values is calculated, and an error is discriminated when the difference is higher than a certain value. By making it possible to freely set the value to be used for the discrimination of an error, it is possible to set a displacement in oscillation frequency of a clock oscillator which is to be discriminated as an error.

4 Claims, 7 Drawing Sheets

101 CLOCK OSCILLATOR a
102 CLOCK OSCILLATOR b
103 CLOCK OSCILLATOR c
104 CLOCK BUS a
105 CLOCK BUS b
106 CLOCK BUS c
117 MODULE
113 CLOCK SELECTING CIRCUIT
115 INTERNAL LOGIC
114 CLOCK SELECTING CIRCUIT
116 INTERNAL LOGIC
118 MODULE
107 COUNTER a
108 COUNTER b
109 COUNTER c
111 TIMING INSTRUCTING CIRCUIT
110 CLOCK SELECTION INSTRUCTING CIRCUIT
112 CLOCK SELECTING MODULE

TA
tx
(a)
(b)
(c)
(d)
(e)
(f)
(g)
(h)
(i)

TA
tx
TB
tx
(a)
(i)
(j)
(k)
(l)
(m)
(b)
(n)
(o)
(p)
(q)
(r)

CLOCK REDUNDANCY SYSTEM

BACKGROUND OF THE INVENTION

1. Field of the Invention

This invention relates to an information processing apparatus, and more particularly to an information processing apparatus which operates with clock pulses from a clock oscillator.

2. Description of the Related Art

Where a conventional information processing apparatus which operates with clock pulses from a clock oscillator has a construction wherein a single clock oscillator is included, a failure of the clock oscillator disables the entire information processing apparatus. Therefore, another construction wherein redundant clock oscillators are provided so that the entire information processing apparatus is prevented from being disabled by a failure of one clock oscillator is conventionally proposed. For example, Japanese Patent Laid-Open No. 112322/1984 discloses an apparatus wherein a plurality of oscillators are provided and an output of a single normal one of the plurality of oscillators is selectively outputted by a supervising circuit which supervises clock pulses of the oscillators to detect a failure of any one of the oscillators.

FIG. 1 is a block diagram showing a circuit construction of the apparatus proposed in the document mentioned above. Referring to FIG. 1, reference numerals 511, 512 denote each an oscillator, 513, 515, 518, 520 denote each a stretcher whose output varies from "0" to "1" simultaneously when the input thereto varies from "0" to "1", but varies, when the input thereto varies from "1" to "0", from "1" to "0" after predetermined stretching time $t_x$, 514, 519, 524 denote each a NOT (inverter) circuit, 516, 517, 521, 522, 523, 525 denote each a logical AND circuit, and 526 denotes a logical OR circuit.

Operation of the circuit shown in FIG. 1 is described below. FIGS. 2(*a*) and 2(*b*) illustrate output signals of oscillator 511, stretchers 513, 515, NOT circuit 514 and logical AND circuit 516 which are part of the circuit shown in FIG. 1.

Referring to FIGS. 2(*a*) and 2(*b*), (i), (n) illustrate the outputs of oscillator 511, (j), (o) illustrate the output of NOT circuit 514, (k), (p) illustrate the output of stretcher 513, (l), (q) illustrate the output of stretcher 515, and (m) (r) illustrate the output of logical AND circuit 516.

FIG. 2(*a*) shows timing waveforms when oscillator 511 stops its oscillation at time $T_A$ and thereafter the output thereof continuously exhibits "0". The period of the output signal of oscillator 511 is represented by t, and the stretching time of stretchers 513, 515 is represented by $t_x$. Further, it is assumed that $t/2<t_x$.

Referring to FIG. 2 (*a*), the output of oscillator 511 is normal till time $T_A$ as seen from (i) and continuously exhibits 0 after time $T_A$. The output of NOT circuit 514 is inverted from "1", "0" of the output of oscillator 511 and has such a waveform as seen from (j). When oscillator 511 is normal, "0", "1" are repetitively inputted to stretcher 513. However, as described above, the output of stretcher 513 varies instantaneously from "0" to "1" when the input to stretcher 513 varies from "0" to "1", but when the input varies from "1" to "0", the output varies from "1" to "0" after stretching time $t_x$. Accordingly, where the input period is t, the time after the output varies from "1" to "0" until it varies from "0" to "1" is t/2 and is shorter than time $t_x$. Consequently, the output of stretcher 513 continues to be "1". However, if the oscillation of oscillator 511 stops at time $T_A$ and the output of it varies to "0", then the output of stretcher circuit 513 varies from "1" to "0" after time $t_x$ after time $T_A$ as seen from (k) of FIG. 2(*a*). Meanwhile, to stretcher 515, a signal inverted from "1", "0" of the output of oscillator 511 by NOT circuit 514 is inputted. Accordingly, the input to stretcher 515 has a waveform which varies from "0" to "1" at time $T_A$ and thereafter keeps "1". In the case of this input, the output of stretcher 515 keeps "1" as seen from (l) which is different from the output of stretcher 513. Accordingly, the output of logical AND circuit 516 which is a result of logical ANDing of the outputs of stretchers 513, 515 is such as seen from (m).

Referring to FIG. 2(*b*), (n) illustrates the output of oscillator 511 when it stops its oscillation at time $T_B$ and the output thereafter exhibits continuous "1". The output of NOT circuit 514 is a signal inverted from input (n) thereto and is such as seen from (o). Accordingly, it is considered that (j), (i) in FIG. 2(*a*) are inputted to stretchers 513, 515, respectively, and from the reason described above, the outputs of stretchers 513, 515 are such as seen from (p), (q) respectively. As a result, the output of logical AND circuit 316 is such as seen from (r).

As described above, functional block A surrounded by broken lines in FIG. 1 which is composed of stretchers 513, 515, NOT circuit 514 and logical AND circuit 516 supervises the output of oscillator 511 and outputs "1" if the output of oscillator 511 is normal, but outputs "0" if the output of oscillator 511 is abnormal.

Also functional block B shown in FIG. 1 which is composed of stretchers 518, 520, NOT circuit 519 and logical AND circuit 521 has a same construction as that of functional block A, and supervises the output of oscillator 512 similarly and outputs "1" if the output of oscillator 512 is normal, but outputs "0" if the output of oscillator 512 is abnormal.

In the following description, functional blocks A, B are referred to as supervising circuits A, B, respectively. FIG. 3 illustrates output waveforms of different elements of the circuit shown in FIG. 1. FIG. 3 shows output waveforms of the different elements when such an abnormal condition as illustrated in FIG. 2(*a*) occurs with oscillator 511 while oscillator 512 is normal. (a) illustrates the output of oscillator 511, (b) the output of supervising circuit A, (c) the output of logical AND circuit 517, (d) the output of oscillator 512, (e) the output of supervising circuit B, (f) the output of NOT circuit 524, (g), (h) illustrate the outputs of logical AND circuits 523, 525, respectively, and (i) illustrates the output of logical OR circuit 526.

If oscillator 511 enters, at time $T_A$, an oscillation stopping condition wherein the output thereof exhibits continuous "0" as seen in FIG. 3, then the output of supervising circuit A varies from "1" to "0" after time $t_x$ after time $T_A$ and has such a waveform as seen from (b). The output of logical AND circuit 517 is a result of logical ANDing between output (a) of oscillator 511 and output (b) of supervising circuit A and has such a waveform as seen from (c). In this instance, the output of supervising circuit A is used so as to pass the output of oscillator 511 if it is normal, but intercept it if it is abnormal.

Meanwhile, since the output of supervising circuit B of oscillator 512 exhibits "1" as seen from (e) because the output of oscillator 512 is normal. The output of NOT circuit 524 is an inverted signal from a result of logical ANDing of the outputs of supervising circuits A, B and has such a waveform as seen from (f). Also logical AND circuit 523 plays a same role as that of logical AND circuit 517 described above, and the output waveform thereof is such as seen from (g). Logical AND circuit 525 plays the following role based on the output of NOT circuit 524. In particular, if both oscillators are normal, then the outputs of supervising circuits A, B are "1", and the output of NOT CIRCUIT 524 is "0". Also the output of logical AND circuit 525 is "0", and the output of oscillator 511 is outputted from logical OR circuit 526. On the other hand, when the output of oscillator 511 is abnormal, the output of NOT circuit 524 is "1", and the output of oscillator 512 is made use of for the first time. Accordingly, the output of logical OR circuit 526 has such a waveform as seen from (h).

As seen from FIG. 2(*b*), this similarly applies also when the oscillator oscillates in a continuous "1" condition, and the output of a normal oscillator is selectively outputted.

Further, though not shown, by using the outputs of supervising circuits A, B, it is possible to report an abnormal condition of an oscillator to the outside of the apparatus. Consequently, a countermeasure can be taken against the abnormal condition of the oscillator before it gives rise to a malfunction of the apparatus, and constantly stable operation of the apparatus can be anticipated.

FIG. 4 is a block diagram showing another circuit construction of the apparatus proposed in the document mentioned hereinabove. In FIG. 4, like elements to those shown in FIG. 1 are denoted by like reference numerals. Referring to FIG. 4, reference numerals 831, 833 denote each a frequency-voltage converter, which outputs a voltage corresponding to a frequency of a waveform inputted thereto. Reference numerals 832, 824 denote each a level detector which discriminates whether or not there is an input voltage which remains within a set voltage which has a certain width and outputs, if there is an input voltage, "1", but outputs "0" if there is no input voltage.

Referring to FIG. 4, the outputs of oscillators 511, 512 are supervised by frequency-voltage converters 831, 833 and level detectors 832, 834, respectively. In particular, if the output frequency of oscillator 511 is normal, then the output voltage of frequency-voltage converter 831 is within the set voltage of level detector 832 which has the certain width, and level detector 832 outputs "1". Then, if the frequency of the oscillator drops, then also the output voltage of frequency-voltage detector 831 drops and this voltage becomes lower than the set value of level detector 832. Consequently, level detector 832 outputs "0". Accordingly, if frequency-voltage converter 831 and level detector 832 are used for the supervising circuits described in connection with the conventional apparatus described above, then not only stopping of the output of an oscillator, but also a drop or a rise of the output frequency can be detected. Accordingly, a higher effect can be anticipated.

However, the prior art described above has the following problems .

The first problem is that, when supervision of the oscillators is performed, an increase of the oscillation frequency of an oscillator cannot be supervised, or even if such supervision is possible, this is unreliable analog supervision and a fine displacement of the oscillation frequency cannot be supervised. This also applies to a drop of the oscillation frequency, and either supervision is possible only where the oscillation frequency drops lower than ½ or only unreliable analog supervision can be performed.

Further, also with regard to reporting of an error of an oscillator, it is only possible to report within the range of the supervision level mentioned above, and it is impossible also to set what degree of increase or drop of the oscillation frequency should be regarded as an error.

Therefore, if the oscillation frequency of an oscillator is displaced delicately, there is the possibility that this may give rise to various problems.

For example, if the oscillator frequency increases, then a clock frequency becomes higher, and this gives rise to a problem of a delay. Consequently, although the hardware is not in failure, an error is detected and operation is stopped, or illegal data are produced.

On the contrary, also when the oscillation frequency drops, this gives rise to various problems similarly. For example, as the performance of the system is dropped, the system is put into an overload condition and hence into a halted condition, or a calendar clock which is referred to during operation of the system is delayed from the actual time, and this may give rise to a malfunction particularly on an application which utilizes a network.

SUMMARY OF THE INVENTION

Accordingly, the present invention has been made in view of the problems described above, and it is an object of the present invention to provide an information processing apparatus, which operates with clock pulses from an oscillator, wherein a malfunction by a variation of the oscillation frequency of the oscillator is prevented thereby to assure a higher degree of reliability.

In order to attain the object described above, an information processing apparatus of the present invention is characterized in that it comprises 2n+1 (n is a positive integer) clock oscillators, 2n+1 clock buses individually connected to the 2n+1 clock oscillators for distributing clocks outputted from the 2n+1 clock oscillators, 2n+1 counters individually connected to the 2n+1 clock buses for individually counting the clocks outputted from the clock oscillators, a clock selection instructing circuit for comparing outputs of the 2n+1 counters and outputting an instruction to select an output of that one of the clock oscillators which is connected to that one of the 2n+1 counters which indicates a middle value, a timing instructing circuit for outputting an instruction to instruct for a timing at which the clock selection instructing circuit should compare values of the 2n+1 counters and reset the 2n+1 counters, a plurality of modules for receiving the clocks from individual ones of the 2n+1 clock buses, and a clock selecting circuit provided in each of the modules for selecting one of the clocks inputted thereto from the 2n+1 clock buses in accordance with the instruction from the clock selection instructing circuit and distributing the selected clock to a logic circuit in the module.

In the invention as set forth in claim 1, an information processing apparatus comprises 2n+1 (n is a positive integer) clock oscillators (101, 102, 103 of FIG. 5), 2n+1 clock buses (104, 105, 106 of FIG. 5) individually connected to the 2n+1 clock oscillators for distributing clocks outputted from the 2n+1 clock oscillators, 2n+1 counters (101, 108, 109 of FIG. 5) individually connected to the 2n+1 clock buses for individually counting the clocks outputted from the clock oscillators, a clock selection instructing circuit (110 of FIG. 5) for comparing outputs of the 2n+1 counters and outputting an instruction to select an output of that one of the clock oscillators which is connected to that one of the 2n+1 counters which indicates a middle value, a timing instructing circuit (511 of FIG. 5) for outputting an instruction to instruct for a timing at which the clock selection instructing circuit should compare values of the 2n+1 counters and reset the 2n+1 counters, a plurality of modules (117, 118 of FIG. 5) for receiving the clocks from individual ones of the 2n+1 clock buses, and a clock selecting circuit (113, 114 of FIG. 5) provided in each of the modules for selecting one of the clocks inputted thereto from the 2n+1 clock buses in accordance with the instruction from the clock selection instructing circuit and distributing the selected clock to a logic circuit in the module.

In the invention as set forth in claim 2, the information processing apparatus of claim 1 further comprises a plurality of difference circuits (401, 402, 403 of FIG. 6) for calculating, for each of the 2n+1 counters of claim 1, differences between the counter and all of the other counters, that is, calculating, for each one counter, differences between the counter and the other 2n counters in accordance with the timing instructed for by said timing instructing circuit, error setting value holding means (404 of FIG. 6) for setting and holding a value which is determined as an error for values of the difference circuits, and an error detecting circuit (411 of FIG. 6) for comparing the values outputted from the difference circuits and the value of the error setting value holding means with each other and detecting that a failure occurs with one of the counters and the clock buses and the clock oscillators both connected to the counters when the outputs of equal to or more than n+1 ones of the difference circuits for one counter are higher than the value of the error setting value holding means.

In the invention as set forth in claim 3, an information processing apparatus comprises 2n+1 (n is a positive integer) clock oscillation circuits (101, 102, 103 of FIG. 7), 2n+1 counters (107, 108, 109 of FIG. 1) for individually counting clocks outputted from the clock oscillators, a clock selection instructing circuit (110 of FIG. 7) for comparing outputs of the 2n+1 counters with each other and outputting an instruction to select the-output of that one of the clock oscillators connected to that one of the 2n+1 counters which indicates a middle value, a timing instructing circuit (111 of FIG. 7) for outputting an instruction to instruct for a timing at which the clock selection instructing circuit should compare values of the 2n+1 counters and reset the 2n+1 counters, and a clock selecting circuit (201 of FIG. 7) for selecting one of the clocks from the 2n+1 clock oscillators in accordance with the instruction from the clock selection instructing circuit and outputting the selected clock.

Further, in the invention as set forth in claim 4, the information processing apparatus of claim 3 further comprises a plurality of difference circuits (401, 402, 403 of FIG. 6) for calculating, for each of the 2n+1 counters of claim 1, differences between the counter and all of the other counters, that is, calculating, for each one counter, differences between the counter and the other 2n counters in accordance with the timing instructed for by said timing instructing circuit, error setting value holding means (404 of FIG. 6) for setting and holding a value which is determined as an error for values of the difference circuits, and an error detecting circuit (411 of FIG. 6) for comparing the values outputted from the difference circuits and the value of the error setting value holding means with each other and detecting that a failure occurs with one of the counters and the clock buses and the clock oscillators both connected to the counters when the outputs of equal to or more than n+1 ones of the difference circuits for one counter are higher than the value of the error setting value holding means.

The information processing apparatus is provided with redundancy by providing 2n+1 oscillators which are important with the information processing apparatus where it operates with clock pulses so that, if a failure occurs with one of the oscillators, the information processing apparatus can continue to operate without malfunctioning and without being halted by using one of the other oscillators.

Selection of one of the outputs of the 2n+1 oscillators which is to be used as a clock by the modules in the information processing apparatus is performed by a determination method like majority logic wherein the clocks of the outputs of the 2n+1 oscillators are counted by the counters and, at every certain timing, the values of the counters are compared with each other and the output of one of the oscillators which correspond to that one of the counters which exhibits a middle value is used as a clock. Consequently, if the number of those oscillators with which a failure occurs is smaller than n, a normal oscillator output can be selected without fail.

Further, the value of each of the 2n+1 counters is compared with the values of the other 2n counters than the self counter and a difference in a comparison is determined as an error if it is larger than a predetermined value, and where the number of errors determined in the 2n comparisons of the self counter with the other counters is n+1 or more, it is discriminated that a failure has occurred with the oscillator connected to the counter or with the counter. Consequently, where the number of oscillators with which a failure occurs is smaller than n, even if the failure originates from a little disorder of the oscillation frequency, the failure can be detected and simultaneously the oscillator with which the failure has occurred can be discriminated. Further, since the difference which should be regarded as an error can be set freely, fine detection of a failure which is required by a user and conforms with the characteristic of the oscillators can be performed.

As described above, according to the present invention, the following effects can be anticipated.

The first effect of the present invention is that, since the information processing apparatus which operates with clock pulses and wherein an oscillator is important is provided with redundancy by providing 2n+1 oscillators, when a failure that the frequency of one of the oscillators becomes higher or lower occurs, the information processing apparatus can detect even a little displacement in frequency and can continue to operate, using one of the other oscillators with which no failure occurs, without suffering from a malfunction or halting.

The reason is such as follows. Selection of one of the outputs of the 2n+1 oscillators which is to be used as a clock by the modules in the information processing apparatus is performed by a determination method like majority logic wherein the clocks of the outputs of the 2n+1 oscillators are counted by the counters and, at every certain timing, the values of the counters are compared with each other and the output of one of the oscillators which correspond to that one of the counters which exhibits a middle value is used as a clock. Consequently, the displacement in frequency of an oscillator can be detected from one clock. Further, the number of those oscillators with which a failure occurs is smaller than n, a normal oscillator output can be selected without fail.

The second effect of the present invention is that, where the number of those oscillators with which a failure occurs is smaller than n, even if the failure originates from a little disorder of the oscillation frequency, the failure can be detected and simultaneously the oscillator with which the failure has occurred can be discriminated, and fine detection of a failure which is required by a user and conforms with the characteristic of the oscillators can be performed.

The reason is that the value of each of the 2n+1 counters is compared with the values of the other 2n counters than the self counter and a difference between counters in a comparison is determined as an error if it is larger than a predetermined value, and where the number of errors determined in the 2n comparisons of the self counter with the other counters is n+1 or more, it is discriminated that a failure has occurred with the oscillator connected to the counter or with the counter.

The third effect of the present invention is that, as an additional effect, the accuracy of the clocks is augmented.

The reason is such as follows. Selection of one of the outputs of the 2n+1 oscillators which is to be used as a clock by the modules in the information processing apparatus is performed by a determination method like majority logic wherein the clocks of the outputs of the 2n+1 oscillators are counted by the counters and, at every certain timing, the values of the counters are compared with each other and the output of one of the oscillators which correspond to that one of the counters which exhibits a middle value is used as a clock. Even with a clock oscillator which is operating with a normal frequency, it exhibits some displacement in oscillation frequency depending upon the clock oscillator. If it is assumed that the displacement in frequency of the oscillator exhibits a normal distribution, then it is statistically apparent that an oscillation frequency having a higher degree of accuracy can be obtained by taking an average value of frequencies of a plurality of oscillators than by using a frequency of a single oscillator as a sample. In the present invention, since a middle oscillation frequency is selected from among frequencies of the 2n+1 oscillators, while this is equivalent to calculation of an average value, an oscillation frequency having a higher degree of accuracy can be obtained.

DESCRIPTION OF THE PREFERRED EMBODIMENTS

Embodiments of the present invention are described below with reference to the drawings.

Figure 1:
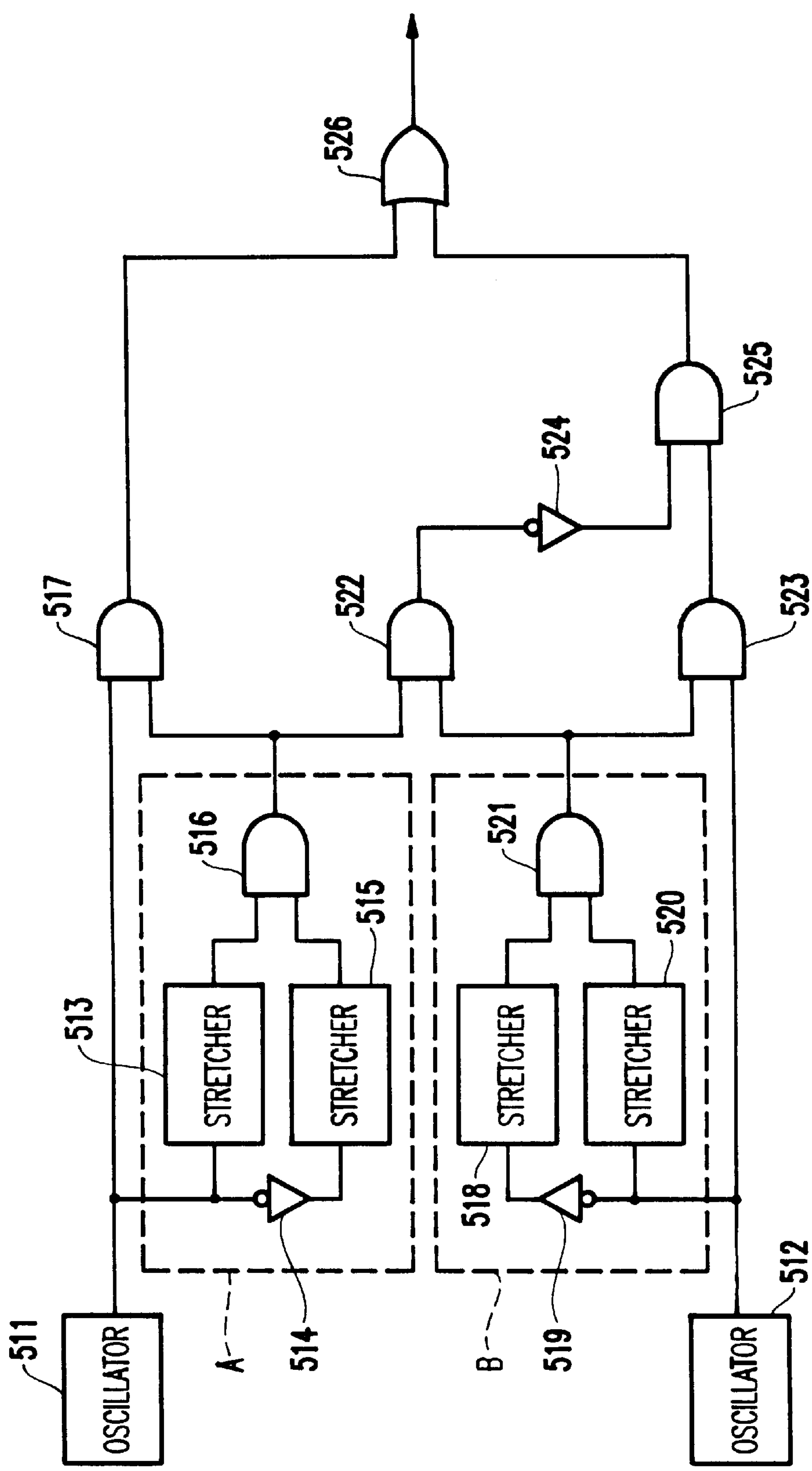
FIG. 1 is a block diagram showing an example of a construction of the prior art.
Figure 3:
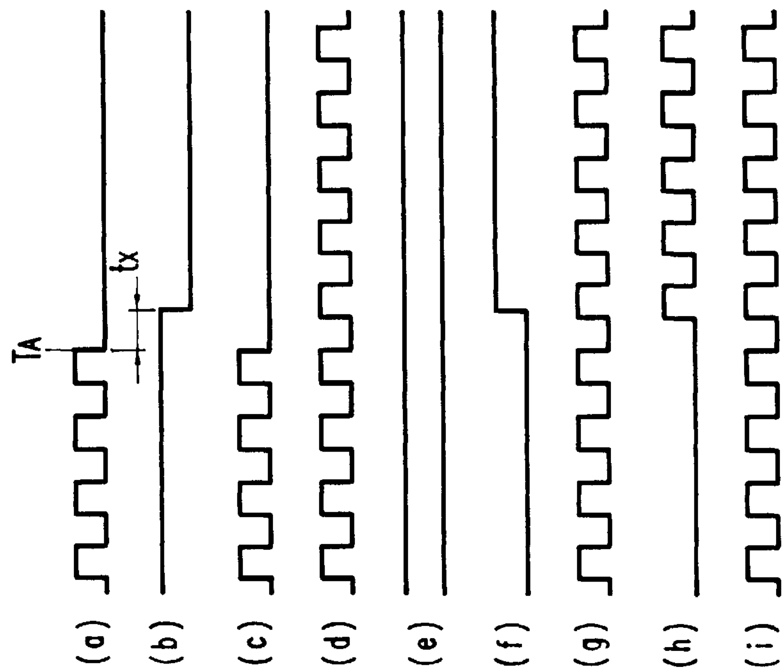
FIG. 3 is a time chart illustrating operation of the construction shown in FIG. 1.
Figure 2:
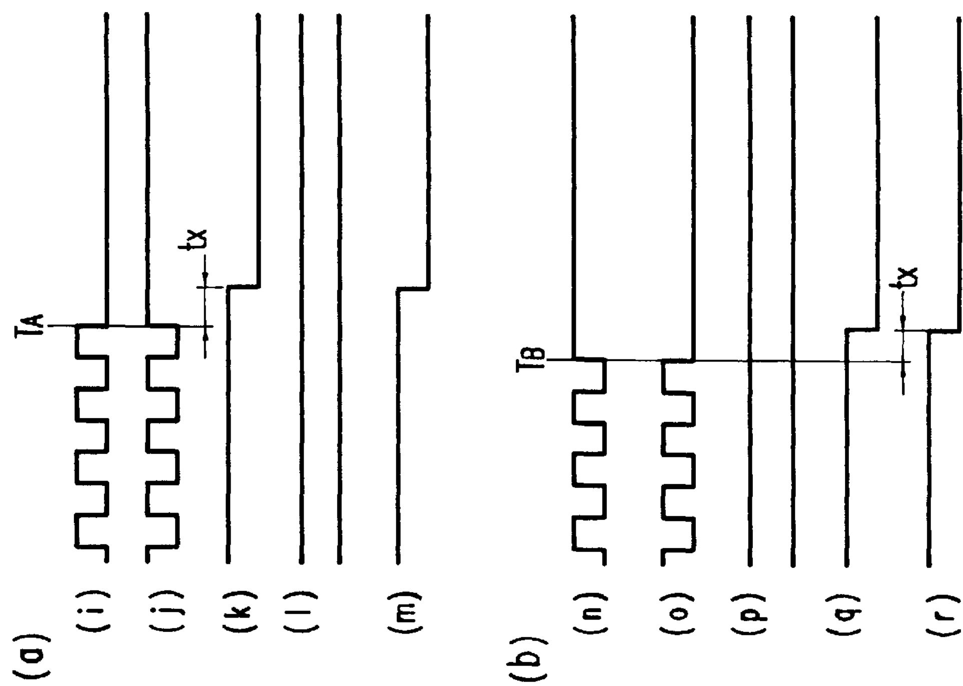
FIGS. 2(*a*) and 2(*b*) are time charts illustrating operation of the construction shown in FIG. 1 and wherein FIG. 2(*a*) is a time chart when an oscillator stops at a falling edge of a clock and FIG. 2(*b*) is a time chart when the oscillator stops at a rising edge of the clock.
Figure 4:
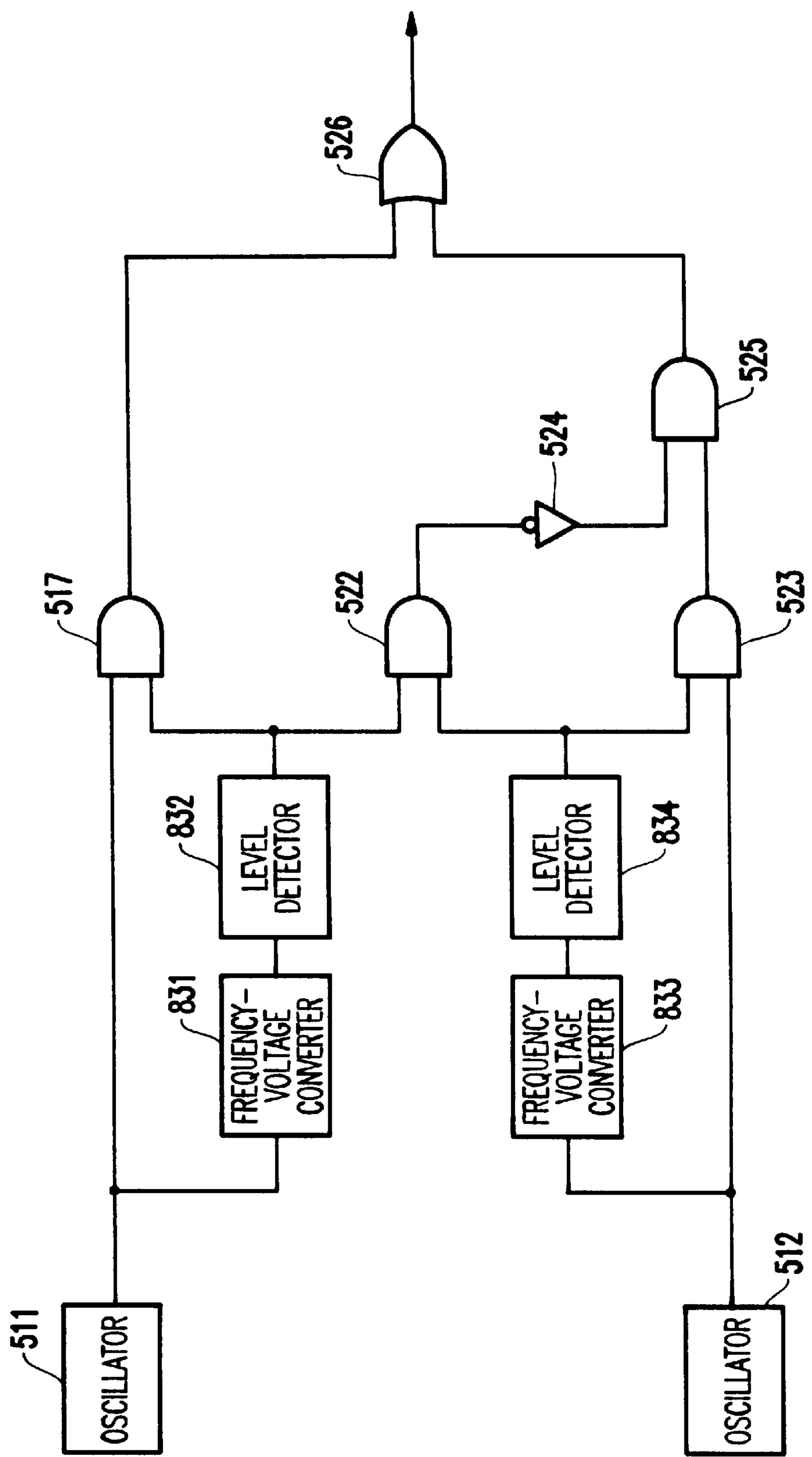
FIG. 4 is a block diagram showing another construction of the prior art.
Figure 5:
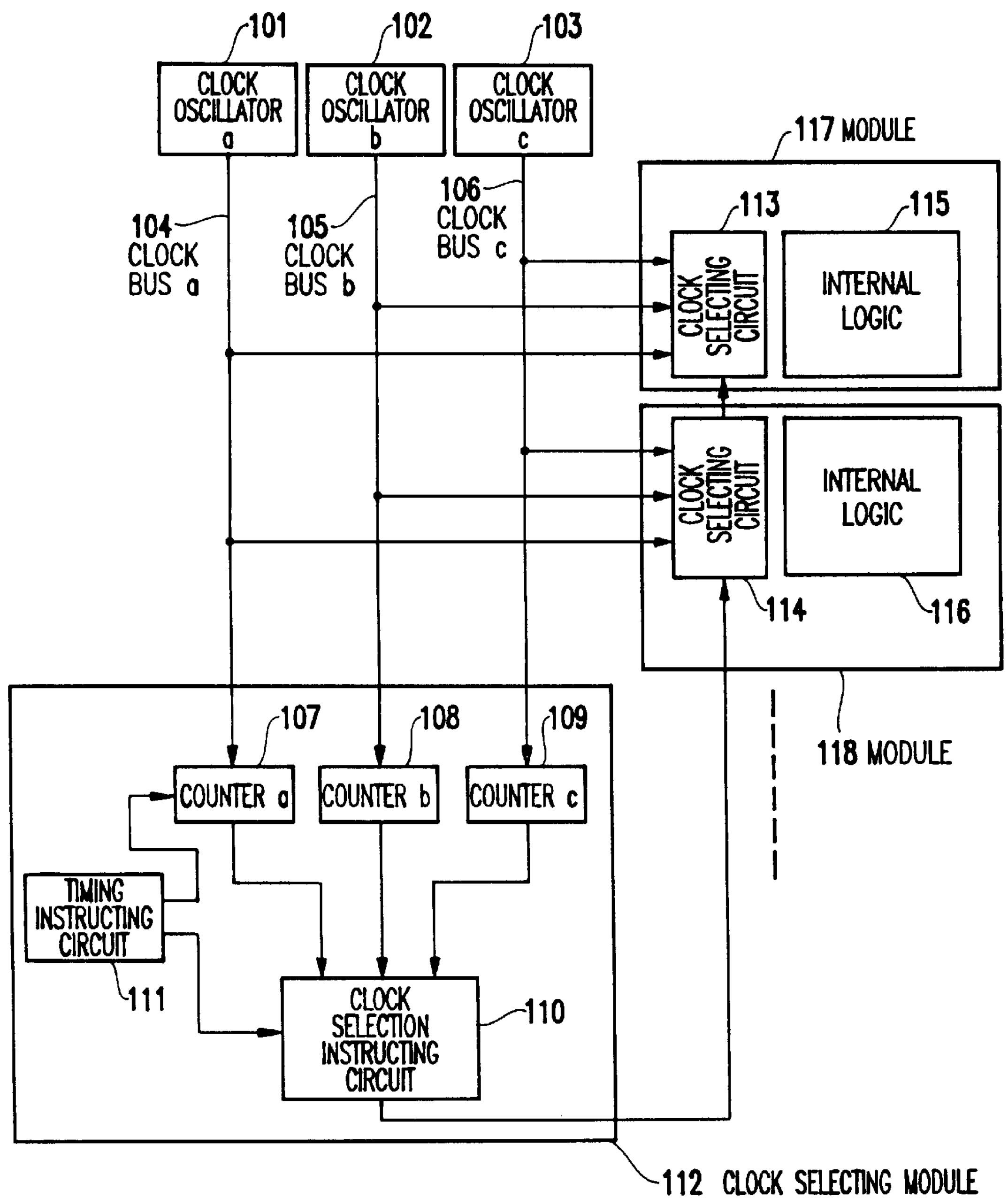
FIG. 5 is a block diagram showing a construction of a first embodiment of a clock redundancy providing system of the present invention.

FIG. 5 is a block diagram showing a construction of a first embodiment of the present invention and showing a construction of (2n+1) clock oscillators where n=1, that is, 3 clock oscillators. Referring to FIG. 5, clock oscillator a 101, clock oscillator b 102 and clock oscillator c 103 are oscillators triplexed for redundancy provision.

Clock bus a 104, clock bus b 105 and clock bus c 106 are connected to clock oscillator a 101, clock oscillator b 102 and clock oscillator c 103, respectively, and distribute clocks in the information processing apparatus.

Clock selecting module 112 connected to clock bus a 104, clock bus b 105 and clock bus c 106 is a module which is composed of counter a 107, counter b 108, counter c 109, clock selection instructing circuit 110 and timing instructing circuit 111.

Counter a 107, counter b 108 and counter c 109 are connected to clock bus a 104, clock bus b 105 and clock bus c 106, respectively, and count clocks distributed thereto from the clock buses connected thereto, that is, clocks outputted from clock oscillator a 101, clock oscillator b 102 and clock oscillator c 103, respectively.

Clock selection instructing circuit 110 compares values of the three counters of counter a 107, counter b 108 and counter c 109 and issues instructions to select, in the individual modules, an output of a clock oscillator connected to that one of the counters which exhibits a middle value.

Timing instructing circuit 111 provides, to clock selection instructing circuit 110, a timing at which a clock selection instruction should be issued, and outputs a signal to reset counter a 107, counter b 108 and counter c 109.

Module 117 includes clock selecting circuit 113 and internal logic circuit 115, and module 118 includes clock selecting circuit 114 and internal logic circuit 116.

Each of clock selecting circuits 113, 114 selectively outputs one of clocks inputted thereto from clock bus a 104, clock bus b 105 and clock bus c 106 in accordance with an instruction from clock selection instructing circuit 110 of clock selecting module 112.

Internal logic circuits 115, 116 operate with clocks selected by clock selecting circuits 113, 114, respectively.

Each of modules 117, 118 is one of modules connected to clock bus a 104, clock bus b 105 and clock bus c 106. Even if a failure occurs with one of clock oscillator a 101, clock oscillator b 102 and clock oscillator c 103, each of modules 117, 118 can prevent a malfunction or halting by the failure of the clock oscillator by selectively using a clock of one of the other clock oscillators with which no failure occurs in accordance with an instruction from clock selection instructing circuit 110.

Operation of the first embodiment of the present invention is described below wish reference to FIG. 5. Clock oscillator a 101, clock oscillator b 102 and clock oscillator c 103 are clock oscillators triplexed for redundancy provision and output clocks of a substantially equal frequency where no failure occurs with them.

Clock bus a 104, clock bus b 105 and clock bus c 106 a re connected to clock oscillator a 101, clock oscillator b 102 and clock oscillator c 103, respectively, and distribute clocks to the individual modules in the information processing apparatus.

Counter a 107, counter b 108 and counter c 109 are connected to clock bus a 104, clock bus b 105 and clock bus c 106, respectively, and count clocks distributed from the clock buses individually connected thereto, that is, clocks outputted from clock oscillator a 101, clock oscillator b 102 and clock oscillator c 103, respectively. Since each counter counts beginning with 0 again if it overflows once, appropriate comparison of the count values cannot be performed if the counters are reset before they overflow. Accordingly, a resetting instruction at an appropriate timing from timing instructing circuit 111 is required.

Clock selection instructing circuit 110 compares the values of the three counters of counter a 107, counter b 108 and counter c 109 and issues an instruction to select, in each module, an output of a clock oscillator connected to that one of the counters which exhibits a middle value. In the present system, the output of a normal clock oscillator is selected, but also a clock oscillator of a middle oscillation frequency is selected from among a plurality of clock oscillators which are operating normally. Consequently, there is an additional effect that a clock frequency which is statistically higher in accuracy can be obtained.

Timing instructing circuit 111 provides, to clock selection instructing circuit 110, a timing at which a clock selecting instruction should be issued, and outputs a signal for resetting counter a 107, counter b 108 and counter c 109 in order that comparison of the counter values may be performed accurately.

Clock selecting module 112 is a module composed of counter a 107, counter b 108, counter c 109, clock selection instructing circuit 110 and timing instructing circuit 111.

Each of clock selecting circuits 113, 114 selects one of the clocks inputted thereto from clock bus a 104, clock bus b 105 and clock bus c 106 in response to an instruction from clock selection instructing circuit 110 and outputs the selected clock.

Internal logic circuits 115, 116 operate with the clock selected by clock selecting circuits 113, 114, respectively.

Each of modules 117, 118 is one of modules connected to clock bus a 104, clock bus b 105 and clock bus c 106. Even if a failure occurs with one of clock oscillator a 101, clock oscillator b 102 and clock oscillator c 103, each of modules 117, 118 can continue to operate without malfunctioning and without being disabled by selectively using the clock of one of the clock oscillators with which no failure occurs in accordance with an instruction from clock selection instructing circuit 110.

Figure 6:
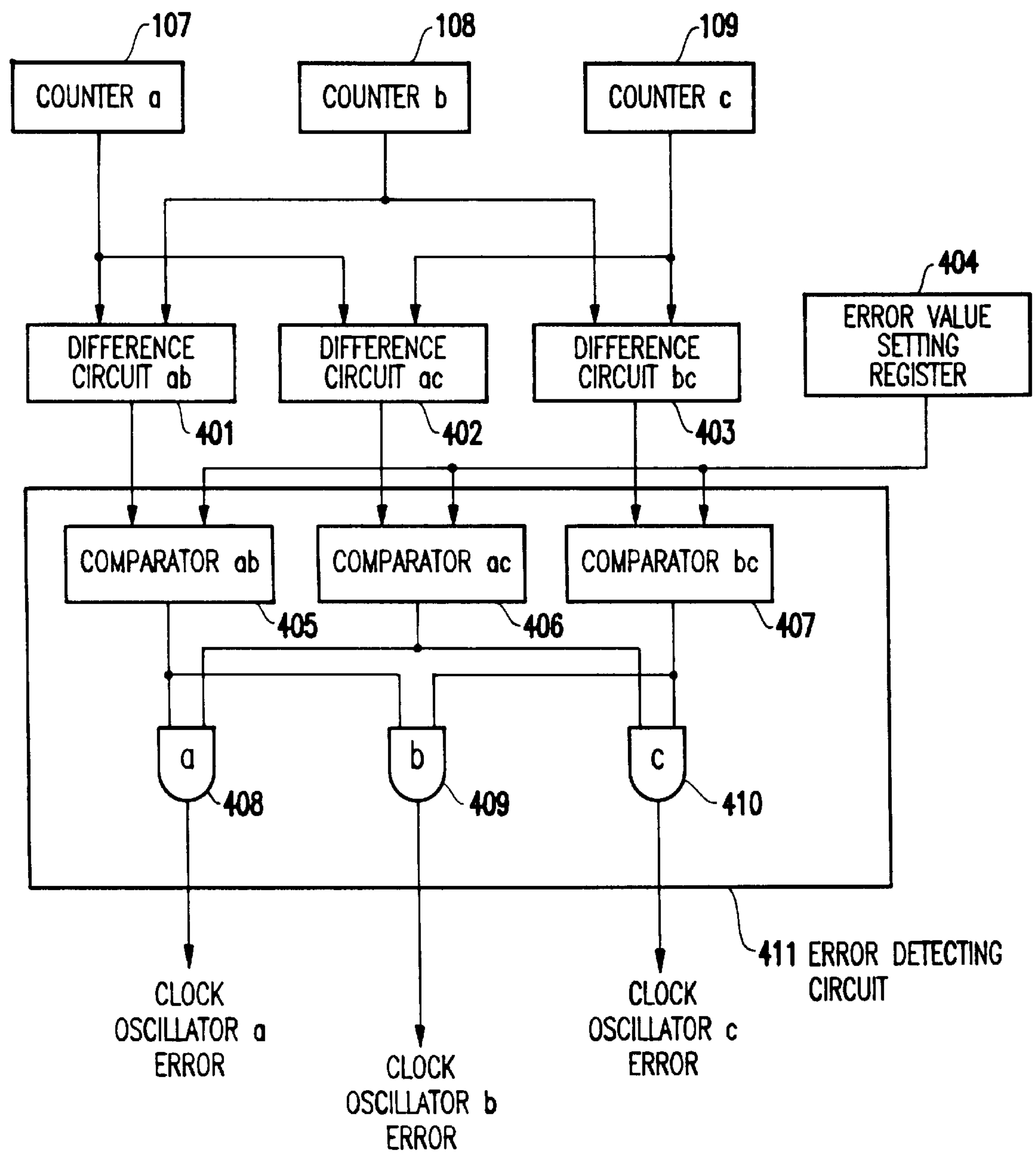
FIG. 6 is a block diagram showing a construction of a second embodiment of the clock redundancy providing system of the present invention.

A second embodiment of the present invention is described. The second embodiment of the present invention is a modification to the first embodiment described above in that clock selecting module 112 of the first embodiment additionally has an error detecting function. FIG. 6 is a block diagram showing a construction of a clock selection module in the second embodiment of the present invention. Referring to FIG. 6, counter a 107, counter b 108 and counter c 109 are same as those shown in FIG. 5, and overlapping description of them is omitted here.

Difference circuit ab 401 calculates and outputs an absolute value of a difference between the values of counter a 107 and counter b 108. Difference circuit ac 402 calculates and outputs an absolute value of a difference between the values of counter a 107 and counter c 109. Difference circuit bc 403 calculates and outputs an absolute value of a difference between the values of counter b 108 and counter c 109.

Error value setting register 404 is a register which holds a value (threshold value) which is used to discriminate an error when any of the differences of the values of the counters is higher than the threshold value.

Error detecting circuit 411 includes comparator ab 405, comparator ac 406, comparator bc 407, AND circuit a 408, AND circuit b 409 and AND circuit c 410, and detects and reports a failure of a clock oscillator, a clock bus or a counter.

More particularly, comparator ab 405 compares an output of difference circuit ab 401 and the value of error value setting register 404 and outputs “1” when the value of difference circuit ab 401 is higher than the value of error value setting register 404. Similarly, comparator ac 406 outputs “1” when the value of difference circuit ac 402 is higher than the value of error value setting register 404, and comparator bc 407 outputs “1” when the value of difference circuit bc 403 is higher than the value of error value setting register 404.

AND circuit a 408 outputs a logical AND of the output of comparator ab 405 and the output of comparator ac 406, and the output thereof indicates that the value of counter a 107 is abnormal and accordingly indicates that a failure has occurred with at least one of clock oscillator a 101, clock bus a 104 and counter a 107.

AND circuit b 409 outputs a logical AND of the outputs of comparator ab 405 and comparator bc 407, and the output thereof indicates that the value of counter b 108 is abnormal and accordingly indicates that a failure has occurred with at least one of clock oscillator b 102, clock bus b 105 and counter b 108.

AND circuit c 410 outputs a logical AND of the outputs of comparator ac 406 and comparator bc 407, and the output thereof indicates that the value of counter c 109 is abnormal and accordingly indicates that a failure has occurred with at least one of clock oscillator c 103, clock bus c 106 and counter c 109.

In the following, operation of the second embodiment of the present invention is described with reference to FIG. 6.

The output of difference circuit ab 401 which calculates and outputs an absolute value of a difference between the values of counter a 107 and counter b 108 resultantly indicates a difference between the oscillation frequencies of clock oscillator a 101 and clock oscillator b 102. The output of difference circuit ac 402 which calculates and outputs an absolute value of a difference between the values of counter a 107 and counter c 109 resultantly indicates a difference between the oscillation frequencies of clock oscillator a 101 and clock oscillator c 103.

Further, the output of difference circuit bc 403 which calculates and outputs an absolute value of a difference between the values of counter b 108 and counter c 109 resultantly indicates a difference between the oscillation frequencies of clock oscillator b 102 and clock oscillator c 103.

The value of error value setting register 404 can be set freely, and consequently, an appropriate value can be set for a clock oscillator having any oscillation frequency.

Comparator ab 405 compares the output of difference circuit ab 401 and the value of error value setting register 404 with each other and outputs “1” when the value of difference circuit ab 401 is higher than the value of error value setting register 404. Consequently, “1” is outputted when an error is detected.

Similarly, comparator ac 406 outputs “1” when the value of difference circuit ac 402 is higher than the value of error value setting register 404, and comparator bc 407 outputs “1” when the value of difference circuit bc 403 is higher than the value of error value setting register 404.

AND circuit a 408 outputs a logical AND of the outputs of comparator ab 405 and comparator ac 406, and the output thereof indicates that the value of counter a 107 is abnormal and consequently indicates that a failure has occurred with clock oscillator a 101, clock bus a 104 or counter a 107.

AND circuit b 409 outputs a logical AND of the outputs of comparator ab 405 and comparator bc 407, and the output thereof indicates that the value of counter b 108 is abnormal and consequently indicates that a failure has occurred with clock oscillator b 102, clock bus b 105 or counter b 108.

AND circuit c 410 outputs a logical AND of the outputs of comparator ac 406 and comparator bc 407, and the output thereof indicates that tie value of counter c 109 is abnormal and consequently indicates that a failure has occurred with clock oscillator c 103, clock bus c 106 or counter c 109.

In this mariner, error detecting circuit 411 detects and reports a failure of a clock oscillator, a clock bus or a counter. However, if two or more (n+1 or more, and in the present embodiment, two or more) failures occur, then all results of logical ANDing may indicate an error. This indicates that incurable fatal multiple failures have occurred.

Figure 7:
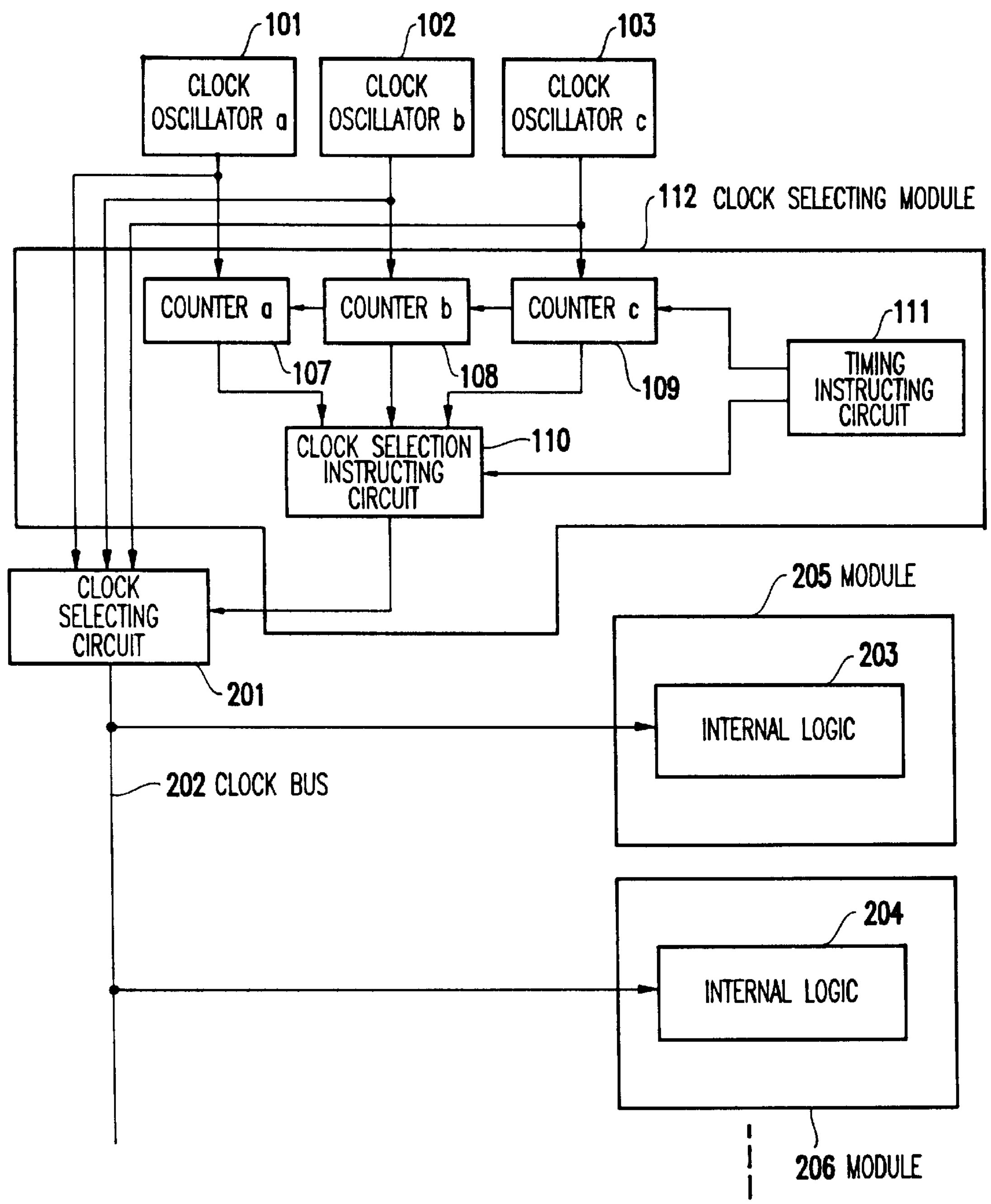
FIG. 7 is a block diagram showing a construction of a third embodiment of the clock redundancy providing system of the present invention.

In the following, a third embodiment of the present invention is described. FIG. 7 is a block diagram showing a construction of the third embodiment of the present invention and is a view showing a construction of (2n+1) clock oscillators where n=1, that is, three clock oscillators. In the third embodiment of the present invention, the basic construction is similar to that of the first embodiment described hereinabove with reference to FIG. 5, and in FIG. 7, like elements to those of the elements of FIG. 5 are denoted by like reference numerals and description of the like elements is omitted here.

Referring to FIG. 7, the third embodiment of the present invention is different from the first embodiment described above in that it includes single clock bus 202 by which a clock selected by clock selecting circuit 201 is distributed while no clock selection is performed in each module.

Clock selecting circuit 201 receives clocks outputted from clock oscillator a 101, clock oscillator b 102 and clock oscillator c 103 as inputs thereto and outputs the clock of one of the oscillators in accordance with an instruction of clock selection instructing circuit 110 of clock selecting module 112.

Clock bus 202 is a bus for distributing the clock of the output of clock selecting circuit 201 to the modules.

Modules 205, 206 include internal logic circuits 203, 204, respectively. Internal logiccircuits203, 204 directly receive a clock from clock bus 202 as an input thereto and operates with the clock.

Operation of the third embodiment of the present invention is described below with reference to FIG. 7. Clock selecting circuit 201 receives clock oscillator a 101, clock oscillator b 102 and clock oscillator c 103 as inputs thereto and outputs the clock of one of the oscillators in accordance with an instruction of clock selection instructing circuit 110. Clock bus 202 is provided to distribute the clock of the output of clock selecting circuit 201 to the modules. Internal logic circuits 203, 204 directly receive the clock from clock bus 202 as an input thereto and operate with the clock.

In the third embodiment of the present invention, only one clock bus 202 is provided as a clock bus, and clock bus 202 distributes a clock selected by clock selecting circuit 201, but selection of a clock in each module as in the first embodiment described above is not performed. Consequently, if a failure occurs at one location of clock bus 202, then distribution of a clock to the individual modules is disabled, but the overall amount of hardware is reduced and simplified compared with that of the construction shown in FIG. 5. The present third embodiment is constructed paying attention to augmentation in reliability of the clock oscillators.

Figure 8:
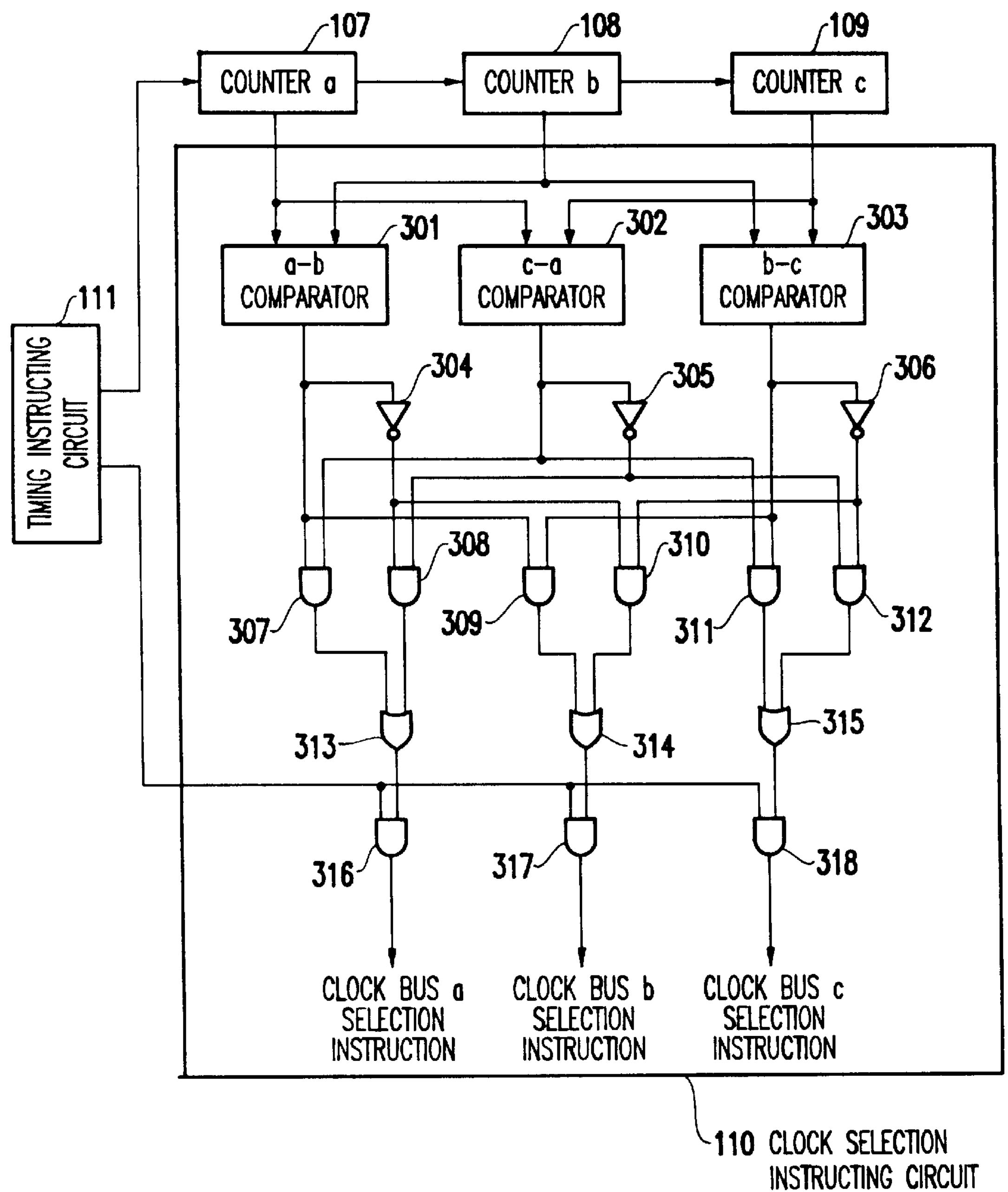
FIG. 8 is a block diagram showing a construction of a block selecting module of the clock redundancy providing system of the present invention, particularly a block selection instructing circuit.

In order to describe the embodiments of the present invention described above in more detail, working examples of the present invention are described below with reference to the drawings. FIG. 8 is a block diagram showing a construction of clock selection instructing circuit 110 of clock selecting module 112 of the embodiments described above.

The first working example of the present invention is described below with reference to FIGS. 5 and 8. While FIG. 5 shows a construction where n=1 from among constructions of 2n+1 clock oscillators, also constructions of clock oscillators such as 5, 7 clock oscillators are possible by varying the value of n. That the construction can withstand up to n failures signifies that, as the value of n increases, also the number of failures which can be withstood even if they occur simultaneously increases.

Clock oscillator a 101, clock oscillator b 102 and clock oscillator c 103 are clock oscillators triplexed for redundancy provision, and output clocks of frequencies substantially equal to each other where they are free from a failure.

Clock bus a 104, clock bus b 105 and clock bus c 106 are connected to clock oscillator a 101, clock oscillator b 102 and clock oscillator c 103, respectively, and distribute clocks of them to the individual modules in the information processing apparatus.

Counter a 107, counter b 108 and counter c 109 are connected to clock bus a 104, clock bus b 105 and clock bus c 106, respectively, and count the clocks outputted from clock oscillator a 101, clock oscillator b 102 and clock oscillator c 103, respectively.

Since each of counter a 107, counter b 108 and counter c 109 counts beginning with 0 again if it overflows once, appropriate comparison of count values cannot be performed if the counters are reset before they overflow. Accordingly, a resetting instruction at an appropriate timing from timing instructing circuit 111 is required. The resetting timing preferably is a timing directly before one of counter a 107, counter b 108 and counter c 109 overflows in order to make the most of the counters.

Clock selection instructing circuit 110 compares the values of the three counters of counter a 107, counter b 108 and counter c 109 and issues an instruction to select, in each module, an output of a clock oscillator connected to that one of the counters which exhibits a middle value. The present system adopts a way of thinking similar to majority logic (here, 3 way voting)

For example, where the normal clock frequency is 100 Mhz, if clock oscillator a 101 oscillates with 97 Mhz, clock oscillator b 102 oscillates with 99 Mhz and clock oscillator c 103 oscillates with clock oscillator b 102 Mhz, then 99 Mhz of clock oscillator b 102 is selected. Accordingly, in the present system, not only the output of a normal clock oscillator is selected, but also a clock oscillator of a middle oscillation frequency is selected from among a plurality of clock oscillators which are operating normally. Consequently, there is an additional effect that a clock frequency which is statistically higher in accuracy can be obtained.

Timing instructing circuit 111 provides, to clock selection instructing circuit 110, a timing at which a clock selecting instruction should be issued, and outputs a signal for resetting counter a 107, counter b 108 and counter c 109 in order that comparison of the counter values maybe performed accurately.

For the timing of the clock selection instruction and the resetting timing to the counters, several timings are possible.

First, the timing of the clock selection instruction and the resetting timing to the counters are set to the same timing. For example, as described above, at a timing immediately before one of counter a 107, counter b 108 and counter c 109 overflows, counter a 107, counter b 108 and counter c 109 are reset, and simultaneously, a clock selection instruction to clock selection instructing circuit 110 is issued.

Second, the timing of the clock selection instruction and the resetting timing of the counters are set different from each other.

For example, the resetting timing of the counters is set such that, similarly as described above, counter a 107, counter b 108 and counter c 109 are reset at a timing immediately before one of counter a 107, counter b 108 and counter c 109 overflows, and the timing of the clock selection instruction to clock selection instructing circuit 110 is set such that, only when an error is detected by an error detection circuit which will be hereinafter described, that is, only when it is considered that a failure has occurred with one of the clock oscillators, a clock selection instruction is issued to clock selection instructing circuit 110 in order to switch the clock to be used in the modules.

Further, the two manners of setting described above may be combined such that a clock selection instruction to clock selection instructing circuit 110 is issued at two timings, that is, when one of the counters overflows and when an error is detected.

Referring to FIG. 8, in clock selection instructing circuit 110, a-b comparator 301 compares counter a 107 and counter b 108 with each other and outputs "1" if the value of counter a 107>the value of counter b 108.

Similarly, c-a comparator 302 compares counter a 107 and counter c 109 with each other and outputs "1" if the value of counter c 109>the value of counter a 107.

b-c comparator 303 compares counter b 108 and counter c 109 with each other and outputs "1" if the value of counter b 108>the value of counter c 109.

NOT circuits 304, 305 and 306 invert the outputs of a-b comparator 301, c-a comparator 302 and b-c comparator 303, respectively.

Here, the value of counter a 107 is represented by A, the value of counter b 108 by B, and the value of counter c 109 by C.

AND circuit 307 outputs a logical AND of the outputs of a-b comparator 301 and c-a comparator 302 and outputs "1" when C>A>B.

AND circuit 308 outputs a logical AND of the outputs of NOT circuit 304 and NOT circuit 305 and outputs "1" when B>A>C.

AND circuit 309 outputs a logical AND of the outputs of a-b comparator 301 and b-c comparator 303 and outputs "1" when A>B>C.

AND circuit 310 outputs a logical AND of the outputs of NOT circuit 304 and NOT circuit 306 and outputs "1" when C>B>A.

AND circuit 311 outputs a logical AND of the outputs of c-a comparator 302 and b-c comparator 303 and outputs "1" when B>C>A.

AND circuit 312 outputs a logical AND of the outputs of NOT circuit 305 and NOT circuit 306 and outputs "1" when A>C>B.

OR circuit 313 outputs a logical OR of AND circuits 307 308. In short, OR circuit 313 logically calculates a logical OR of AND circuits 307, in the cases of C>A>B and B>A>C. Accordingly, when the output of OR circuit 313 is "1", this indicates that the value of counter a 107 is a middle value from among the three counters, and an instruction to select the clock of clock bus a 104 is outputted.

OR circuit 314 outputs a logical OR of AND circuits 309, 310. In short, OR circuit 314 logically calculates a logical OR in the cases of A>B>C and A>C>B. Accordingly, when the output of OR circuit 314 is "1", this indicates that the value of counter b 108 is a middle value among the three counters, and an instruction to select the clock of clock bus b 105 is outputted.

OR circuit 315 outputs a logical OR of AND circuits 311, 312. In short, OR circuit 315 logically calculates a logical OR in the cases of B>C>A and A>C>B. Accordingly, when the output of OR circuit 315 is "1", this indicates that the value of counter c 109 is a middle value among the three counters, and an instruction to select the clock of clock bus c 106 is outputted.

AND circuits 316, 317 and 318 logically AND a timing instruction signal outputted from timing instructing circuit 111 to render the outputs of OR circuit 313, OR circuit 314 and OR circuit 315 effective to instruct for selection of clock bus a 104, clock bus b 105 and clock bus c 106, respectively, only at the timing indicated by timing instructing circuit 111.

Further, it is also possible to triplex clock selecting module 112 described above such that clock selection instructions from the three clock selecting modules are used by clock selecting circuits 113, 114 using majority logic in order to achieve a construction which is augmented in reliability.

Referring to FIG. 5 again, each of clock selecting circuits 113, 114 selectively outputs one of those of clocks inputted from clock bus a 104, clock bus b 105 and clock bus c 106 which are inputted from normal clock buses in accordance with to an instruction from clock selection instructing circuit 110. For example, where clock selecting circuits 113, 114 select the clock from clock bus a 104, if a failure occurs with and stops clock oscillator a, then clock selection instructing circuit 110 issues a clock selection instruction to select a clock bus other than clock bus a. Consequently, clock selecting circuits 113, 114 continue to supply a normal clock to internal logic circuits 115, 116, respectively.

Internal logic circuits 115, 116 of modules 117, 118, which are those modules in a plurality of modules in the information processing apparatus which are connected to clock bus a 104, clock bus b 105 and clock bus c 106, operate with clocks selected by clock selecting circuits 113, 114, respectively.

Even if a failure occurs with clock oscillator a 101, clock oscillator b 102 and clock oscillator c 103, each of modules 117, 118 continues to operate without suffering from a malfunction or without being disabled by selectively using the clock of a clock oscillator with which no failure occurs in accordance with an instruction from clock selection instructing circuit 110 in such a manner as described above.

Further, as described also in the foregoing description, since clock selecting modules are provided redundantly and on-line repair by which each module can be exchanged during operation of the information processing apparatus including the clock oscillators is made possible, also implementation of the information processing apparatus which does not suffer from system halting is possible.

A second working example of the present invention is described below with reference to FIG. 6.

As described hereinabove, difference circuit ab 401 calculates and outputs an absolute value of a difference between the values of counter a 107 and counter b 108. The output of difference circuit ab 401 resultantly indicates a difference between oscillation frequencies of clock oscillator a 101 and clock oscillator b 102. Even if clock oscillator a 101 and clock oscillator b 102 are normal, some difference appears between them. This similarly applies to the other difference circuits described below. Difference circuit ac 402 calculates and outputs an absolute value of a difference between the values of counter a 107 and counter c 109. The output of difference circuit ac 402 resultantly indicates a difference between oscillation frequencies of clock oscillator a 101 and clock oscillator c 103. Difference circuit bc 403 calculates and outputs an absolute value of a difference between the values of counter b 108 and counter c 109. The output of difference circuit bc 403 resultantly indicates a difference between oscillation frequencies of clock oscillator b 102 and clock oscillator c 103.

The value held by error value setting register 404 and used to discriminate an error when any of the differences of the values of the counters is higher than the value can be set freely, and an appropriate value can be set for a clock oscillator having any oscillation frequency. For example, if the resetting timing of the three counters is set to a timing immediately prior to an overflow of one of the counters, then if a value at the timing immediately prior to the overflow is set, then error detection is possible only when a failure occurs with and stops one of the clock oscillators. If the value for error discrimination is 10% the count value at the timing immediately prior to an overflow, then an error is detected when the difference between the values of the counters does not fall within the range of the oscillation frequency of −10% to +11.1%.

Comparator ab 405 compares the values of the output of difference circuit ab 401 and error value setting register 404 with each other, and outputs "1" when the value of difference circuit ab 401 is higher than the value of error value setting register 404. In short, comparator ab 405 outputs "1" when it detects an error. Similarly, comparator ac 406 outputs "1" when the value of difference circuit ac 402 is higher than the value of error value setting register 404, and comparator bc 407 outputs "1" when the value of difference circuit bc 403 is higher than the value of error value setting register 404.

AND circuit a 408 outputs a logical AND of the outputs of comparator ab 405 and comparator ac 406, and the output thereof indicates that the value of counter a 107 is abnormal, that is, a failure has occurred with clock oscillator a 101, clock bus a 104 or counter a 107. The logic of the discrimination that the value of counter a 107 is abnormal is that, since both of a result of the comparison with counter b 108 and a result of the comparison with counter c 109 are abnormal, where it is assumed that one failure has occurred, it is concluded that the value of counter a 107 is abnormal. If a plurality of failures occur, then all of AND circuit a 408, AND circuit b 409 and AND circuit c 410 may indicate an error, and in this instance, it is indicated that fatal errors have occurred. This similarly applies to the other AND circuits described below.

AND circuit b 409 outputs a logical AND of the outputs of comparator ab 405 and comparator bc 407, and the output thereof indicates that the value of counter b 108 is abnormal, that is, a failure has occurred with clock oscillator b 102, clock bus b 105 or counter b 108. AND circuit c 410 outputs a logical AND of the outputs of comparator ac 406 and comparator bc 407, and the outputs thereof indicates that the value of counter c 109 is abnormal, that is, a failure has occurred with clock oscillator c 103, clock bus c 106 or counter c 109.

Error detecting circuit 411 composed of comparator ab 405, comparator ac 406, comparator bc 407, AND circuit a 408, AND circuit b 409 and AND circuit c 410 detects and reports a failure of a clock oscillator, a clock bus or a counter. An influence of the failure can be eliminated by using an input of a clock bus selected by the clock selecting circuits of all of the modules. However, if two or more (n+1 or more, and in the present embodiment, two or more) failures occur in the present embodiment, then all clocks may be discriminated as an error. This indicates that incurable fatal failures have occurred.

A result of clock selection instructing circuit 110 may be used in a manner different from that described above. A counter which indicates a middle value becomes clear from a result indicated by clock selection instructing circuit 110. This is to subtract the values of the other two counters from the value of the particular counter and compare the difference values with a value of the error value setting register to discriminate an error. Where this method is used, setting of a finer error condition is possible by setting a positive value for an upper limit on the higher side of the clock frequency and a negative value for a lower limit on the lower side of the clock frequency separately in the error value setting register and discriminating an error either when a result of subtraction of the counter of the middle value is higher than the upper limit of the error setting value register or when the result of subtraction is lower than the lower limit.

Subsequently, a further working example of the present invention is described with reference to FIG. 7. Clock selecting circuit 201 receives clocks outputted from clock oscillator a 101, clock oscillator b 102 and clock oscillator c 103 as inputs thereto and outputs the clock of one of the oscillators in accordance with an instruction of clock selection instructing circuit 110. Since clock selecting module 112 including clock selection instructing circuit 110 is similar to that of FIG. 7 described hereinabove in connection with the first working example, description of the same is omitted here.

Clock bus 202 is a provided to distribute a clock of an output of clock selecting circuit 201 to the modules. Internal logic circuits 203, 204 of modules 205, 206 directly receive the clock from clock bus 202 as inputs thereto and operate with the clock.

The construction shown in FIG. 7 is characterized in that it can be applied simply also to an existing system by modification to modules around the clock oscillators.

What is claimed is:

1. An information processing apparatus, comprising:

2n+1 clock oscillators, n being a positive integer;

2n+1 clock buses each connected respectively to one of said 2n+1 clock oscillators for distributing clocks outputted from said 2n+1 clock oscillators;

2n+1 counters each connected respectively to one of said 2n+1 clock buses for individually counting the clocks outputted from said clock oscillators;

a clock selection instructing circuit for comparing outputs of said 2n+1 counters and outputting an instruction to select an output of that one of said clock oscillators which is connected to that one of said 2n+1 counters which indicates a middle value;

a timing instructing circuit for outputting an instruction to instruct for a timing at which said clock selection instructing circuit should compare values of said 2n+1 counters and reset said 2n+1 counters;

a plurality of modules for receiving the clocks from individual ones of said 2n+1 clock buses; and a clock selecting circuit provided in each of said modules for selecting one of the clocks inputted thereto from said 2n+1 clock buses in accordance with the instruction from said clock selection instructing circuit and distributing the selected clock to a logic circuit in the module.

2. An information processing apparatus as claimed in claim 1, further comprising:

a plurality of difference circuits for calculating, for each of said 2n+1 counters, differences between the counter and all of the other counters, that is, calculating, for each one counter, differences between said counter and the other 2n counters in accordance with the timing instructed for by said timing instructing circuit;

error setting value holding means for setting and holding a value which is determined as an error for values of said difference circuits; and an error detecting circuit for comparing the values outputted from said difference circuits and the value of said error setting value holding means with each other and detecting that a failure occurs with one of said counters and said clock bus and clock oscillator that are connected to said one of said counters when the outputs of n+1 or greater of said difference circuits for one counter are higher than the value of said error setting value holding means.

3. An information processing apparatus, comprising:

2n+1 clock oscillation circuits, n being a positive integer;

2n+1 counters each for counting the clock outputted from an associated clock oscillator;

a clock selection instructing circuit for comparing outputs of said 2n+1 counters with each other and outputting an instruction to select the output of that one of said clock oscillators connected to that one of said 2n+1 counters which indicates a middle value;

a timing instructing circuit for outputting an instruction to instruct for a timing at which said clock selection instructing circuit should compare values of said 2n+1 counters and reset said 2n+1 counters; and a clock selecting circuit for selecting one of the clocks from said 2n+1 clock oscillators in accordance with the instruction from said clock selection instructing circuit and outputting the selected clock.

4. An information processing apparatus as claimed in claim 3, further comprising:

a plurality of difference circuits for calculating, for each of said 2n+1 counters, differences between the counter and all of the other counters, that is, calculating, for each one counter, differences between the counter and the other 2n counters in accordance with the timing instructed for by said timing instructing circuit;

error setting value holding means for setting and holding a value which is determined as an error for values of said difference circuits; and an error detecting circuit for comparing the values outputted from said difference circuits and the value of said error setting value holding means with each other and detecting that a failure occurs with one of said counters and said clock bus and clock oscillator that are connected to said one of said counters when the outputs of n+1 greater of said difference circuits for one counter are higher than the value of said error setting value holding means.

* * * * *